Jan. 1, 1946.   E. FRANKEL   2,392,240
SYSTEM FOR HEATING, COOLING AND AIR CONDITIONING OF BUILDINGS
Filed Oct. 6, 1943   2 Sheets-Sheet 1
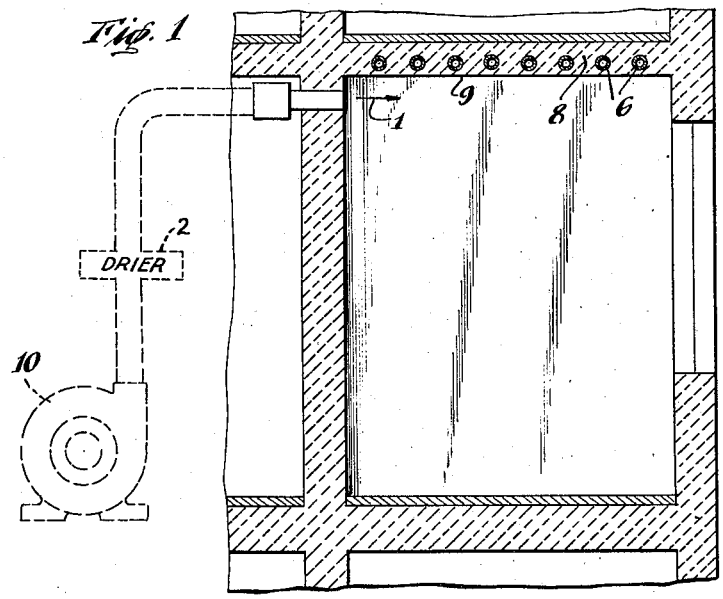
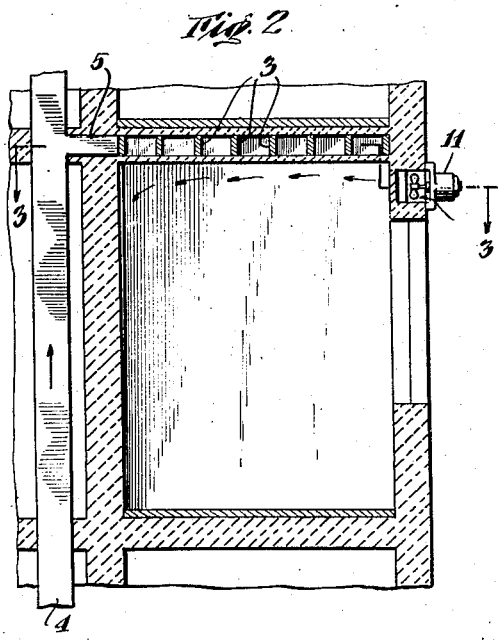
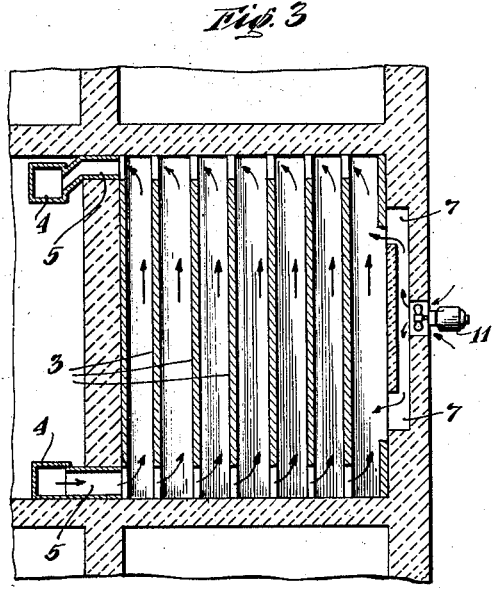
INVENTOR.
Enrique Frankel
BY
Arquet, Meary & Campbell
ATTORNEYS

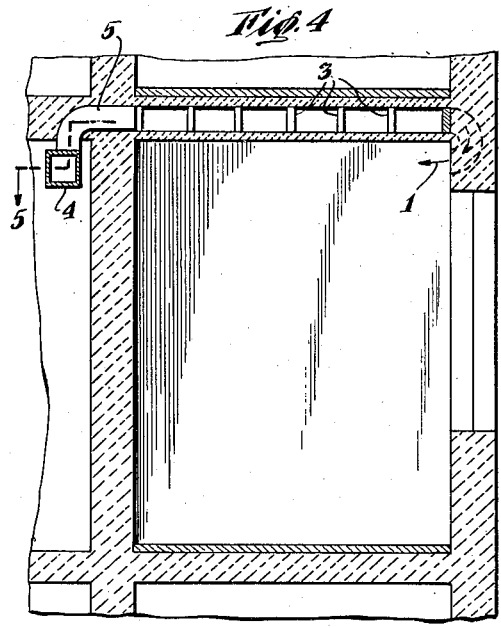
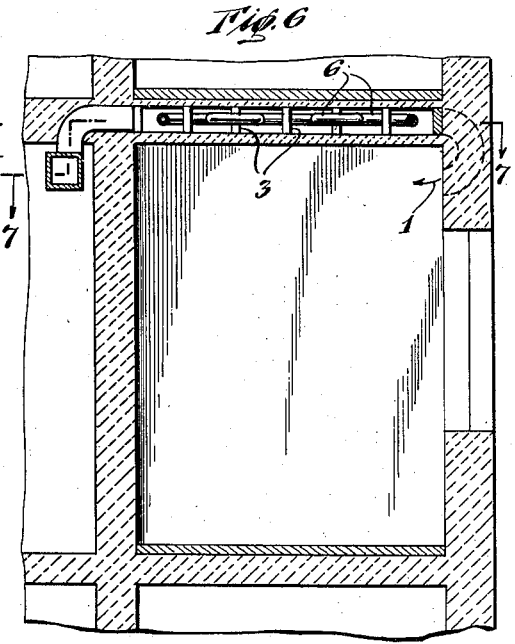
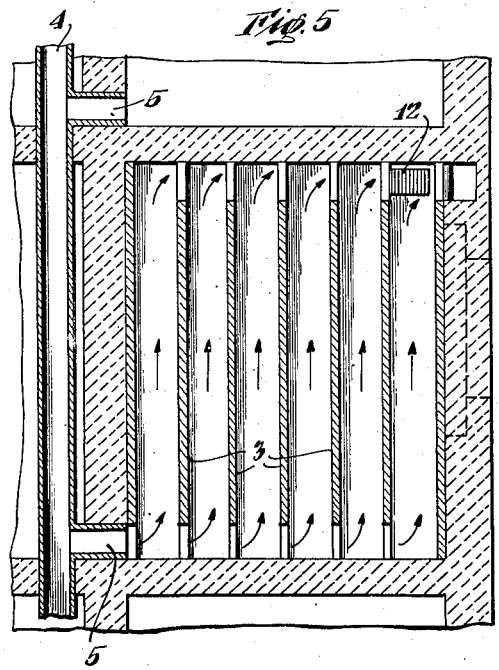
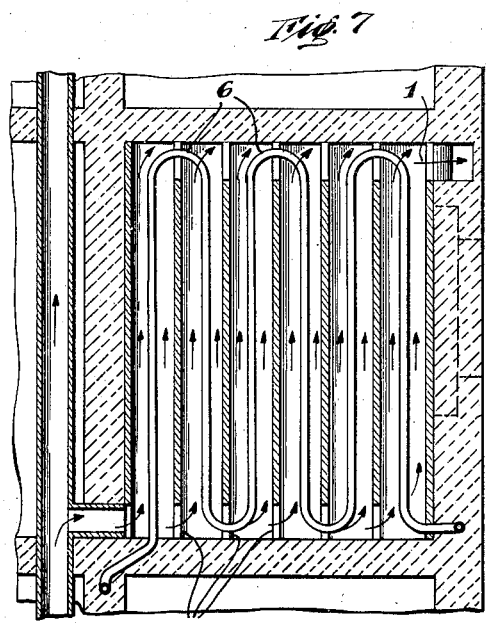

Patented Jan. 1, 1946

2,392,240

UNITED STATES PATENT OFFICE 2,392,240

SYSTEM FOR HEATING, COOLING, AND AIR CONDITIONING OF BUILDINGS

Enrique Frankel, Santiago, Chile

Application October 6, 1943, Serial No. 505,166

3 Claims. (Cl. 257—17)

The present invention relates to the heating, cooling and air conditioning of buildings by means of radiated heating or cooling in combination with ventilation.

The various systems of radiated heating may be easily employed for cooling in summer by establishing a circulation of cooling means through the radiators instead of the heating means, but this solution has its drawbacks, the chief of these being the danger of condensation of water on the radiating surfaces on account of the increase of the relative humidity of the air when cooled in contact with said surfaces. Such condensation damages the plastering. To solve this difficulty plasters which are capable of absorbing a certain amount of moisture without deteriorating, and humidostats which cut off the relative humidity at approximately 100%, have been tried. These solutions do not give satisfactory results, since plasters only allow a small absorption of moisture and the humidostat prevents the working of the installation in accordance with the needs.

One of the principal objects of the present invention is to provide a cooling system, for enclosures provided with radiated cooling, whereby air of any desired degree of dryness may be injected into the enclosure in close proximity to or directly against the radiating surfaces, and preferably in a parallel direction or tangential to these surfaces so as to set up convection currents of air in the ambient atmosphere. As the temperature and absolute humidity in the cooled enclosure rises on account of the respiration and cooling of persons occupying the space, a condition will normally be reached where the moisture content (absolute humidity) of the ambient air at the mean temperature of the space will be such as to cause condensation of moisture therefrom if portions of the thus humidified air are brought into contact with the cooling radiating surfaces and remains in such contact for any substantial length of time. By injecting drier air—air having a lower relative humidity—adjacent the radiating cooling surfaces, the tendency for moisture to condense out of the ambient air upon the cooling surfaces will be overcome. This dry air may be air in its natural state or dehumidified or conditioned air, as the case requires.

Another object of the invention is to facilitate the tempering or conditioning of the ambient air in such enclosures by regulating the temperature of the air, ceilings and walls, each independently of the others, thus giving to the present system a degree of flexibility not attained by any other.

Another object of the invention is, when the radiating surface is heated or cooled by air, to utilize the same air after it has heated or cooled said surface by injecting it into the enclosure to be air conditioned in proximity to such surface, thus preventing at the same time the above mentioned condensation and promoting uniform heating of the space. In order to prevent excessive heating or cooling in such cases suitable devices may be employed for reheating or recooling the air before its entrance to the enclosure.

When cooling of the enclosure to be conditioned is produced by circulating a cooling fluid through tubing placed in the spaces between floor or ceiling joists disposed above such enclosure, condensation may be prevented either at the enclosure ceiling in the manner hereinbefore dscribed or by driving air through said joist spaces, or even by causing the air which will be injected into the enclosure to previously pass through said spaces.

An advantage of the system of this invention is that if unconditioned air is used for the injection into the enclosure, whether it is for heating or cooling, an increase of convection from the radiating surfaces is obtained, due to the greater circulation of air near these surfaces, and thus the tempering of the injected air before it gets into contact with the occupants is produced.

Various forms of application of the invention are schematically illustrated in the accompanying drawings, in which:

Fig. 1 is a vertical section illustrating the system applied in connection with the more usual type of radiated heating or radiated cooling with tubing embedded in floors or ceilings;

Fig. 2 illustrates in vertical section another way of injecting the air, in combination with radiation heating or cooling by air sent through the joist spaces;

Fig. 3 is a cross-section on the line 3—3 of Fig. 2 showing the direction followed by the air heating or cooling current, corresponding to the method shown in Fig. 2;

Fig. 4 shows in vertical section the method of application of the system wherein air passed through the joist spaces in order to heat (or cool) the radiating surface is afterwards used for the injection into the enclosure;

Fig. 5 is a cross-section on the line 5—5 of Fig. 4 through the joists showing the direction of the air current in the modification shown in Fig. 4 with a reheating or recooling device embodied therein;

Fig. 6 shows in vertical section the application of the system in combination with tubing freely placed in the joist spaces, the air first passing through said spaces in order to become tempered before being injected into the enclosure; and Fig. 7 is a cross-section on the line 7—7 of Fig. 6 which shows the tubing and the direction followed by the air current in the combination shown in Fig. 6.

Referring now to Fig. 1, an air current 1 produced by a blower 10 is injected into an enclosure in the proximity of ceiling 9 which is heated or cooled by tubing 6 embedded in floor 8. A drier 2 of any suitable design may be provided for drying the air current and arranged to be selectively rendered operative or inoperative as required. The air circulation obtained by the injected air current 1 facilitates the tempering of the enclosure by convection, and in the case of cooling, air current 1 prevents condensation on ceiling 9.

In the application illustrated in Figs. 2 and 3, circulating air, indicated by arrows, and impelled by any suitable means through ducts 4 and 5, traverses the spaces between floor joists 3 in the manner shown in Fig. 3, and air from an independent source, such as the fan 11, is introduced through the openings 7 and directed tangentially toward and across the ceiling, when it descends and mingles with the ambient air.

In Figs. 4 and 5 we have an application of the system wherein an air current at a predetermined temperature is sent through ducts 4 and 5 and spaces between joists 3 as before, but wherein the same air is thereafter injected into the enclosure. Heating or cooling apparatus, indicated diagrammatically at 12, may be located at the outlet of the air current from the joist spaces. After passing through this apparatus, the tempered air is then injected into the enclosure.

A similar distribution of air to that shown in Figs. 4 and 5 is that of Figs. 6 and 7, but the heating or cooling of the air in the joist spaces is done by tubing 6 freely located between the joists 3.

It will be understood that the embodiments of my invention shown in the drawings are illustrative only and that any changes may be made in the details of the arrangements without departing from the spirit of my invention, which is not to be deemed as limited otherwise than as indicated in the appended claims.

I claim:

1. In an air tempering system for dwellings and other buildings, means for cooling the atmosphere of a room or other enclosed space therein by radiation through an enclosing surface thereof, means for directing relatively dry air into said spaced in a direction substantially tangential to said surface and in proximity thereto, and means for flowing said relatively dry air in said direction with sufficient force to inhibit condensation of moisture from the ambient air onto said surface and promote the tempering of said ambient air.

2. In an air tempering system for dwellings and other buildings wherein the temperature of the atmosphere of a room or other enclosed space therein is regulated by radiation through the ceiling thereof, tubes disposed in the air spaces between the ceiling joists for conducting a cooling medium in heat absorbing relation to the ceiling, means for circulating air through said spaces about said tubes and thence into the room and along and in proximity to the ceiling within said room to prevent condensation of moisture on the ceiling.

3. In an air tempering system for dwellings and other buildings, means for circulating a cooling medium in heat absorbing relation to an enclosing surface of an enclosed space, and means for circulating air about said first means and in heat transfer relation thereto and thereafter directing the air so circulated and tempered into said enclosed space in a direction substantially parallel and in proximity to said surface, said air circulating means including a blower whereby the air directed into said enclosed space continues as directed over a substantial extent of said surface and is maintained in proximity thereto.

ENRIQUE FRANKEL.